BEST AVAILABLE COPY

SHEARER.

LOG-TURNERS FOR SAW MILLS.

No. 6,777. Reissued Nov. 30, 1875.

Witnesses
R. H. Eyer.
E. Thurman.

Inventor
George H. Shearer
by Geo. W. Brown & Co
Attys

N. PETERS, PHOTO-LITHOGRAPHER, WASHINGTON, D. C.

UNITED STATES PATENT OFFICE.

GEORGE H. SHEARER, OF BAY CITY, MICHIGAN.

IMPROVEMENT IN LOG-TURNERS FOR SAW-MILLS.

Specification forming part of Letters Patent No. 147,181, dated February 3, 1874; reissue No. 6,777, dated November 30, 1875; application filed April 28, 1874.

*To all whom it may concern:*

Be it known that I, GEORGE H. SHEARER, of Bay City, in the county of Bay and State of Michigan, have invented an Improvement in Log-Turners for Saw-Mills, of which the following is a specification:

This invention relates to an improvement in that class of devices for turning logs on saw-carriages, wherein a spiked bar is projected up past the edge of the carriage by mechanism below the floor to turn the log; and the invention therein consists in the combination of the operative devices connected with the spiked bar, and in the combination of a friction-wheel with a stationary brake, all as more fully hereinafter set forth.

Figure 1:
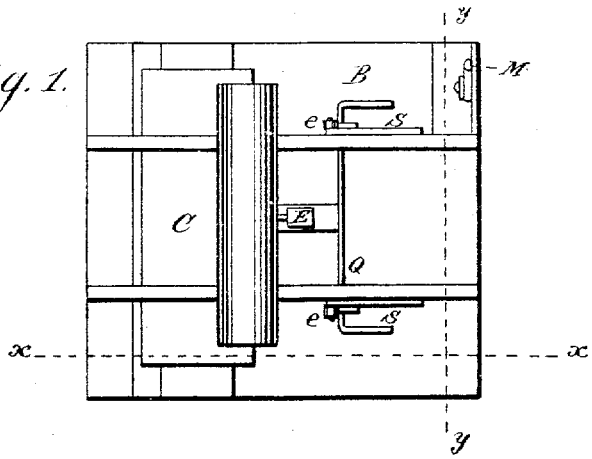
Figure 2:
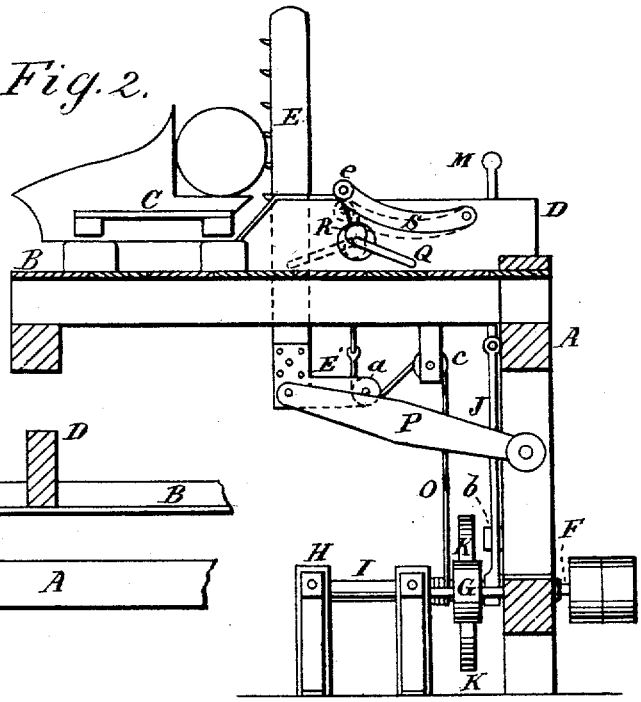
Figure 3:
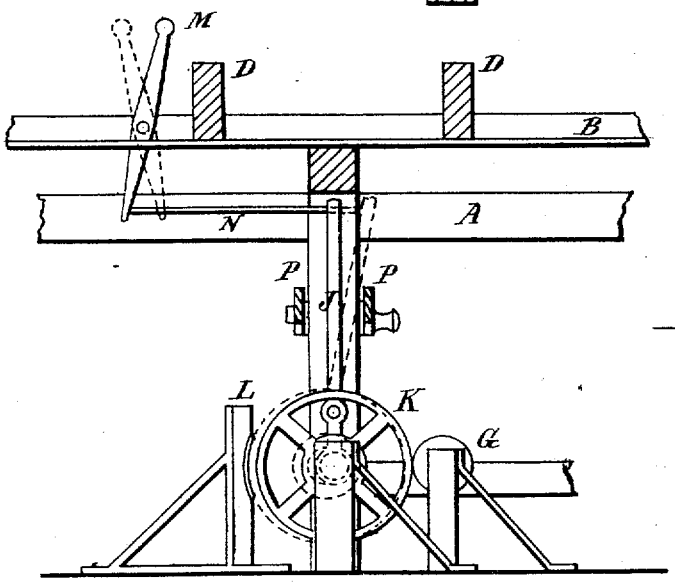

Figure 1 is a plan view of a portion of the mill-floor, carriage, and skids. Fig. 2 is a cross-section at *x x*, and Fig. 3 is a longitudinal vertical section at *y y*, of Fig. 1.

In the drawing, A represents a part of the frame-work of the mill-house; B, the mill-floor, and C the log-carriage. D D are the skids, on which the logs are placed preparatory to their transfer to the carriage for sawing. E is a spiked bar, playing through a slot in the mill-floor close to the edge of the carriage. To its lower end are bolted two L-shaped plates, E′, having journaled at their projecting ends a pulley, *a*. F is a shaft journaled in bearings in the lower part of the mill-frame, transversely to the direction of the movement of the saw-carriage, and is continuously rotated from any convenient source of power. G is a friction-wheel keyed on the shaft F. In a post, H, which supports the foot of the bar E when it is down, is journaled a shaft, I, whose other end has a bearing in a lever, J, pivoted at *b* to a post in the mill-frame. K is a friction-wheel, keyed on the shaft I, and behind it a stationary brake, L, is erected on the ground-floor. M is a lever, pivoted in a slot in the mill-floor, above which its upper end projects. A rod, N, connects the lower end of the hand-lever M to the top of the lever J. O is a cord, having one end attached to a beam under the mill-floor, being led from thence down around the pulley *a* in the angular foot of the spike-bar; thence up around a pulley, *c*, suspended from the same beam; thence down, and attached to the shaft I. Two radius-rods, P P, are pivoted to the sides of the post to which the lever I is pivoted, their other ends embracing and pivoted to the heel of the spike-bar.

To turn a log on the carriage, the sawyer moves the lever M to the left, which gives the shaft I a slight movement, bringing its friction-wheel K into contact with the running friction-wheel G, causing the shaft I to rotate and wind up the rope O on it, drawing up the spike-bar, the strain upon which being at the end of its angular heel, tilts it at the top toward the log, while the radius-rods move the foot toward the log as it rises, causing the spiked face of the bar to be forcibly pressed toward the log, preventing any tendency to slip on it while turning it. When the log is turned to the desired position, to hold it in that position while being dogged fast, the sawyer quickly moves the lever M to the right forcibly pressing the back part of the rim of the friction-wheel K against the stationary brake L, which prevents the spiked bar from falling down of its own weight until pressure is released from the lever M.

To prevent the logs on the skids from rolling toward the carriage and interfering with the working of the log-turning device, I journal a shaft, Q, through the skids, and turn a crank on each end. On this shaft, near the outer side of each skid, I secure an eccentric, R, on which rests the short arm of an L-shaped bar, S, pivoted at the other extremity to the skid side. By means of the eccentrics these bars S may be raised at their angles above the planes of the skids, and present the inclined planes to the advance of the logs rolling on the skids, which would roll or jump over them except for the provision which I make against such contingency by forging a wrist on each bar at the heel of its angle, on which I sleeve a roller, *e*, which projects a little above the bar. As soon as the log strikes these rollers it rotates on its axis, and rolls back down the incline planes until wanted on the carriage, when a partial rotation of the eccentrics brings the rollers below the plane of the skids, and allows the log to roll onto the carriage.

In lieu of the eccentrics, cranks may be employed to raise and lower the check-bars S.

What I claim as my invention, and desire to secure by Letters Patent, is—

1. In combination, the toothed bar E, with an angular foot, the radius-bars P P, pivoted to the angle of the foot, and the pulley *a* at the end of the foot, for the purpose of simultaneously raising and tilting the toothed bar, substantially as described.

2. In combination, the shaft Q, the eccentric R, the L-shaped bar S, and roller *i*, for the purpose of preventing the log from rolling toward the carriage, substantially as described.

3. In log-turning devices, the combination, with the wheel K, of the stationary brake L, substantially as and for the purpose specified.

4. The combination, with the spiked bar E, of the radius-bars P, shafts F I, friction-wheels G K, levers J M, brake L, cord or chain O, pulleys *a e*, constructed and arranged to operate substantially as described, and for the purposes set forth.

GEORGE H. SHEARER.

Witnesses:

T. V. ANDREWS,

H. S. SPRAGUE.